(12) United States Patent
Ediger et al.

(10) Patent No.: US 8,544,826 B2
(45) Date of Patent: Oct. 1, 2013

(54) ULTRASONIC HUMIDIFIER

(75) Inventors: Glen W. Ediger, North Newton, KS (US); Gary P. Israel, Andover, KS (US)

(73) Assignee: Vornado Air, LLC, Andover, KS (US)

( * ) Notice: Subject to any disclaimer, the term of this patent is extended or adjusted under 35 U.S.C. 154(b) by 405 days.

(21) Appl. No.: 12/922,252

(22) PCT Filed: Mar. 13, 2009

(86) PCT No.: PCT/US2009/037123
§ 371 (c)(1),
(2), (4) Date: Oct. 20, 2010

(87) PCT Pub. No.: WO2009/114782
PCT Pub. Date: Sep. 17, 2009

(65) Prior Publication Data
US 2011/0031636 A1  Feb. 10, 2011

Related U.S. Application Data

(60) Provisional application No. 61/036,238, filed on Mar. 13, 2008.

(51) Int. Cl.
*B01F 3/04* (2006.01)

(52) U.S. Cl.
USPC .............................. 261/30; 261/78.2; 261/81

(58) Field of Classification Search
USPC ......... 261/28, 30, 78.2, 81, DIG. 48, DIG. 65
See application file for complete search history.

(56) References Cited

U.S. PATENT DOCUMENTS

| | | | | | |
|---|---|---|---|---|---|
| 3,901,443 | A | * | 8/1975 | Mitsui et al. | 239/102.2 |
| 3,970,250 | A | * | 7/1976 | Drews | 239/102.2 |
| 3,990,427 | A | * | 11/1976 | Clinebell | 126/113 |
| 5,485,828 | A | * | 1/1996 | Hauser | 128/200.16 |
| 5,624,608 | A | * | 4/1997 | Ching et al. | 261/30 |
| 6,244,576 | B1 | * | 6/2001 | Tsai | 261/141 |
| 6,511,050 | B2 | * | 1/2003 | Chu | 261/66 |
| 7,377,493 | B2 | * | 5/2008 | Thomas | 261/30 |
| 7,810,742 | B2 | * | 10/2010 | Levi | 239/102.2 |
| 2003/0051886 | A1 | * | 3/2003 | Adiga et al. | 169/43 |
| 2006/0115388 | A1 | * | 6/2006 | Sanderson | 422/168 |
| 2011/0250978 | A1 | * | 10/2011 | O'Neill | 472/65 |

\* cited by examiner

*Primary Examiner* — Charles Bushey
(74) *Attorney, Agent, or Firm* — David H. Milligan

(57) ABSTRACT

An ultrasonic humidifier is disclosed including a chamber, an ultrasonic transducer positioned at the bottom of the chamber, a passage in fluid communication with the chamber, a duct having an inlet and an outlet, the duct being in fluid communication with the passage by way of a passage outlet, a fan positioned in the duct and disposed between the duct inlet and the passage outlet. The fan is configured to propel air through the duct and over the passage outlet such that vapors in the chamber may be drawn into the duct.

6 Claims, 1 Drawing Sheet

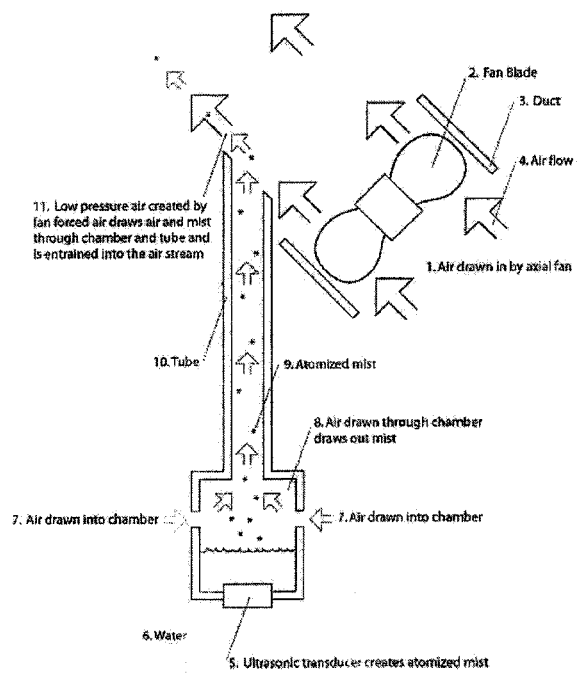

2. Fan Blade

3. Duct

4. Air flow

11. Low pressure air created by fan forced air draws air and mist through chamber and tube and is entrained into the air stream 1. Air drawn in by axial fan 10. Tube 9. Atomized mist 8. Air drawn through chamber draws out mist 7. Air drawn into chamber 7. Air drawn into chamber 6. Water 5. Ultrasonic transducer creates atomized mist

ULTRASONIC HUMIDIFIER

CROSS REFERENCE TO RELATED APPLICATION

This application is a U.S. National Application of International Application PCT Application No. PCT/US2009/037123 filed on Mar. 13, 2009, which claims the benefit of priority from U.S. Provisional Patent Application No. 61/036,238 filed Mar. 13, 2008. The disclosures of International Applicant PCT Applicant No. PCT/US2009/037123 and U.S. Provisional Patent Application No. 61/036,238 are incorporated herein by reference.

BACKGROUND

There are four major types of mechanical humidifiers. Steam humidifiers boil water and release the warm steam into a room. Impeller humidifiers utilize a fast rotating disk in combination with a comb to first liberate large droplets of water and then break the droplets into smaller diffusible droplets that are introduced into the room. Evaporative systems use a wick that in positioned in a water source. The water migrated along the wick by capillary action and evaporates into the air. A blower may be used to increase the rate of evaporation. Ultrasonic humidifiers use a submerged, vibrating metal diaphragm or ultrasonic board to impart mechanical energy to the water. The use of ultrasonic energy results in the formation of an atomized mist above the surface of the reservoir.

In ultrasonic humidifiers, an electronic component called a transducer which is capable of transforming electrical energy into mechanical energy for generating a cool mist is used. More specifically, the transducer includes a vibrating part called a nebulizer which vibrates quietly at greater than 1.5 million times per second in order to convert water into a fine, cool mist. Humidifiers using a nebulizer for generating a cool mist are more commonly referred to as ultrasonic humidifiers and are the latest advance in the humidifier field.

Ultrasonic humidifiers usually incorporate a removable water tank or container for holding a supply of water. The tank contains a valve which controls the flow of water from the tank into a reservoir at the bottom of the humidifier. The nebulizer for churning the water into a fine, cool mist is usually located at the bottom of the reservoir. When the water tank is fully or partly empty it is simply lifted out, taken to a source of water such as a water faucet, refilled and then returned for subsequent use.

Ultrasonic humidifier technology has been used in humidifier products in the consumer market for several years. When this technology was first introduced it was a big success in the US market. Retailers and customers were impressed by the visible mist that was emitted from these units, they were safe to use, yet they were cool-to-the-touch.

After several years on the market the problems of the ultrasonic humidifiers became known to the public, and the sales of these humidifiers all but died. The major problem was "White Dust". This occurs during the evaporation process, (changing from a liquid to a gas) this happens after the mist (micro-droplets of water) leaves the unit and evaporates in the air, allowing small amounts of water born contaminants (primarily calcium) to drop to the floor, and ultimately creating a dusty white coating on horizontal surfaces.

A resurgence of ultrasonic humidifiers slowly started again with the added use of a mineral filtration cartridge to remove contaminants from the water before they become air-borne. This also reduced the contamination build-up on the transducer disks that create the ultrasonic action. This also helped reduced some of the cleaning requirements of the ultrasonic transducer disk.

Additionally, in the last several years, manufacturers have also added a method to warm the ultrasonic mist, with a heating device that warms the water before the ultrasonic atomization. This has allowed for consumers, with the flip of a switch, to choose between cool or warm ultrasonic humidification.

The method used to evacuate the atomized micro droplets of water from the typical ultrasonic humidifier is to use a small blower fan, blowing the droplets out of the unit to be dispersed into the room. This method is effective but does not allow for any whole-room disbursement of the vapors. The water droplets tend to just spew out a few feet and then drop to the floor as they evaporate. Accordingly, there is a need for an ultrasonic humidifier that more efficiently disperses humidity throughout a room.

BRIEF SUMMARY

Some embodiments relate to an ultrasonic humidifier comprising a chamber, an ultrasonic transducer positioned at the bottom of the chamber, a passage in fluid communication with the chamber, a duct having an inlet and an outlet, the being in fluid communication with the passage by way of a passage outlet, a fan positioned in the duct and disposed between the duct inlet and the passage outlet. The fan is configured to propel air through the duct and over the passage outlet such that vapors in the chamber may be drawn into the duct.

BRIEF DESCRIPTION OF THE DRAWINGS

FIG. 1 is a schematic of an ultrasonic humidifier.

DETAILED DESCRIPTION

Referring to FIG. 1, air is drawn into a fan duct and propelled by a fan. The propelled air stream is passed over a tube positioned above a water chamber. The water chamber may include an inlet for water from a reservoir that is configured to keep the water level in the chamber relatively constant. An ultrasonic transducer may be positioned at the bottom of the chamber and is configured to produce an atomized mist in the area of the chamber above the surface of the water. One or more inlets may be positioned above the water surface to allow air to be drawn into the chamber and up through the tube.

As the propelled air passes over the opening of the tube, the relatively low pressure of the propelled air results in a negative pressure at the top of the tube. The air and atomized mist in the tube in turn migrates into the fan duct and is entrained with the propelled air. Air is drawn into the chamber at the bottom of the tube through the inlets.

This allows for the additional feature of whole-room circulation in combination with an ultrasonic humidifier. The atomized droplets of water, and with the use of a ducted fan, are propelled outwardly and across a room, to provide better evaporation range and whole-room humidification. This whole-room circulation effectively distributes the humidity evenly around the entire room, unlike most ultrasonic humidifiers that only spew humidity out a few feet.

The ultrasonic mist is entrained into the airstream using the "Bernoulli Principle". High velocity air is low pressure air. If one end of a tube is inserted into high stream air, air will be drawn through this tube. If this tube is place over ultrasonic vapors the vapors will also be drawn through the tube and entrained into the high velocity air stream. In some embodiments, clear plastic may be used for portions of the humidifier to allow a user to observe the visual effect of the vortex air stream.

Although the foregoing has been described with reference to exemplary embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements. Many other changes and modifications may be made to the present invention without departing from the spirit thereof. The scope of these and other changes will become apparent from the appended claims. The steps of the methods described herein may be varied, and carried out in different sequences.

What is claimed is:

1. An ultrasonic humidifier comprising;
   a chamber;
   a mist generator positioned at the bottom of the chamber;
   a tube having a passage in fluid communication with the chamber;
   a duct having an inlet and an outlet, the duct being in fluid communication with the passage by way of a passage outlet;
   a fan positioned in the duct and disposed between the duct inlet and the passage outlet;
   wherein the tube is arranged to extend at an angle to the direction of air flow through the duct, and having the passage outlet formed along the wall of the duct, the angle being acute when measured from the bottom of the chamber to the fan; and
   wherein the fan is configured to propel air through the duct and over the passage outlet such that vapors in the chamber may be drawn into the air flow from the duct.

2. The ultrasonic humidifier of claim 1, wherein the duct is positioned above the chamber.

3. The ultrasonic humidifier of claim 1, wherein the duct is directed upwardly from the fan.

4. The ultrasonic humidifier of claim 2, wherein the duct is positioned above the chamber.

5. The ultrasonic humidifier of claim 1, wherein the mist generator is an ultrasonic transducer.

6. An ultrasonic humidifier comprising;
   a chamber;
   an ultrasonic transducer positioned at the bottom of the chamber;
   a tube having a passage in fluid communication with the chamber;
   a duct positioned above the chamber, the duct having an inlet and an outlet, the duct being in fluid communication with the passage by way of a passage outlet;
   a fan positioned in the duct and disposed between the duct inlet and the passage outlet;
   wherein the tube is arranged to extend at an angle to the direction of air flow through the duct, and having the passage outlet formed along the wall of the duct, the angle being acute when measured from the bottom of the chamber to the fan; and
   wherein the fan is configured to propel air through the duct and over the passage outlet such that vapors in the chamber may be drawn into the air flow from the duct and the duct is directed upwardly from the fan.

\* \* \* \* \*